(12) United States Patent
Chan et al.

(10) Patent No.: US 7,008,908 B2
(45) Date of Patent: Mar. 7, 2006

(54) SELECTIVE STIMULATION WITH SELECTIVE WATER REDUCTION

(75) Inventors: Keng Seng Chan, Sugar Land, TX (US); Pia-Angela Francini, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 295 days.

(21) Appl. No.: 10/302,075

(22) Filed: Nov. 22, 2002

(65) Prior Publication Data
US 2004/0102331 A1    May 27, 2004

(51) Int. Cl.
*E21B 33/13* (2006.01)
*C09K 3/00* (2006.01)

(52) U.S. Cl. ............. 507/225; 507/203; 507/269; 507/271; 507/277; 166/292; 166/294; 166/295

(58) Field of Classification Search ............... 166/292, 166/294, 295; 507/203, 225, 240, 244, 269, 507/271, 277
See application file for complete search history.

(56) References Cited

U.S. PATENT DOCUMENTS

| | | | | |
|---|---|---|---|---|
| 5,979,557 A | * | 11/1999 | Card et al. | 166/300 |
| 6,194,356 B1 | * | 2/2001 | Jones et al. | 507/225 |
| 6,605,570 B1 | * | 8/2003 | Miller et al. | 507/211 |
| 6,767,869 B1 | * | 7/2004 | DiLullo et al. | 507/244 |
| 6,929,070 B1 | * | 8/2005 | Fu et al. | 166/308.2 |
| 2002/0189810 A1 | * | 12/2002 | DiLullo et al. | 166/294 |
| 2005/0003969 A1 | * | 1/2005 | DiLullo | 507/211 |
| 2005/0209108 A1 | * | 9/2005 | Fu et al. | 507/200 |

FOREIGN PATENT DOCUMENTS

DE     263896     1/1989

OTHER PUBLICATIONS

Insights into Water Control: A Review—pp. 61-62, *Journal of Petroleum Technology—Mar. 2003* .
SPE 79012—New Insights into Water Control—A Review of the State of the Art—Part II by Gino Di Lullo, Phil Rae, and James Curtis.

* cited by examiner

Primary Examiner—Philip C. Tucker
(74) Attorney, Agent, or Firm—Thomas O. Mitchell; Tim Curington; Robin Nava

(57) ABSTRACT

A method for preferentially treating a subterranean formation having at least one primarily oil producing layer and at least one primarily water producing layer. The method involves the steps of providing a water shut-off gel into the formation to preferentially treat the water producing layers. This is followed by providing a viscoelastic fluid into the formation, where the viscoelastic fluid is broken by hydrocarbon, thereby remaining and viscosifying primarily in the water producing layers. Finally, a reactive fluid, such as an acid fluid, is provided. The reactive fluid treats primarily the oil producing layers because the viscoelastic fluid and the water shut-off gel prevent the reactive fluid from substantially entering the water producing layers.

21 Claims, 4 Drawing Sheets

SELECTIVE STIMULATION WITH SELECTIVE WATER REDUCTION

BACKGROUND

1. Field of the Invention

The present invention relates to a method of treating a subterranean formation. More specifically, the invention is a method for selectively acidizing a primarily oil producing zone in a formation comprised of a primarily hydrocarbon producing zone and a primarily water producing zone.

2. Description of the Prior Art

Certain oil producing wells are formed or completed in formations which contain both oil producing zones and water producing zones. Unless measures are taken to change or effect the production rates from each of these zones, the particular reservoir characteristics (i.e., water cut increase and trend, total liquid inflow rate increase and trend, oil and water cumulative production cross-plots, and down-hole inflow profile surveys) will dictate the amount of water and oil produced from the well.

Acidizing is an art that applies a reactive fluid, such as a matrix acidizing composition, including solvents and additives, to contact and dissolve wellbore damages. Zone selectivity may be achieved by using a mechanical method, such as coiled tubing with packers, or by using a fluid or an additive which diverts the reactive fluid from zone to zone, as needed. Conventionally, target treatment zones are isolated by mechanical methods and tools such as bridge plugs, inflatable packers or temporary chemical blocking systems or the combinations of thereof depending on wellbore completion and conditions. These methods, if applicable, provide zonal isolation only at the wellbore.

Alternatively, a water zone or layer may be shut-off by injecting a delayed gelling fluid or a delayed precipitating fluid into that layer. To ensure proper and accurate zone selection, the location and source of water must be identified and a mechanical or chemical zone isolation method then applied.

The use of viscoelastic surfactant gels have also been shown to divert the acid or the reactive fluid to preferentially enter a specific zone or layer and may even avoid acidizing water zones. Recently, viscoelastic surfactant gels has been developed not only for fracture stimulation but also for acidizing. A good example is the use of a viscoelastic surfactant to formulate a proppant carrying fracturing fluid for hydraulic fracturing. The use of viscoelastic surfactant gels or the like, either foamed or unfoamed provides more effective temporary isolation since these fluids are capable of penetrating deep into the rock formation.

SUMMARY OF THE INVENTION

The present invention provides a method for treating a formation having multiple zones or layers. Particularly, the formation may have at least one zone which produces or contains primarily oil and/or other hydrocarbons ("oil producing layers") and at least one zone which produces primarily water ("water producing layers"). It should be understood that the oil producing layers may produce any type of hydrocarbon, including hydrocarbon gases The method involves first preferentially isolating the water zones, thereby minimizing or decreasing the flow of water from these zones. Typically, the water zones are isolated with a water shut-off ("WSO") composition or gel. The WSO compositions useful in the present invention are typically formulated or prepared to preferentially target or treat the water producing zones of the formation.

A second step in the present invention involves providing a viscoelastic surfactant ("VES") fluid into the formation. The viscoelastic fluid will penetrate both the oil producing layers and the water producing layers; however, since VES fluids may be formulated to degrade or "break" in the presence of hydrocarbons, the VES fluid may thicken in the water zones but will remain or become substantially less viscous in the oil producing layers. The thickened or viscous VES fluid in the water producing layers aids in preventing or impeding additional treatment fluids from entering or penetrating the water producing layers or interacting with the WSO gel.

A third step in the method involves providing a reactive fluid, such as a matrix acidizing composition, into the formation. The reactive fluid will preferentially penetrate or enter the oil producing zones due to the lack of VES fluid or WSO gel present in those layers. Conversely, the thickened VES fluid and the WSO gel in the water producing layers will substantially prevent the reactive fluid from penetrating or interacting with the water producing layers.

Optionally, an additional step may be included in the method, following injection of the WSO gel, but prior to the injection of the VES fluid. A water or brine spacer may be injected to the formation. The spacer may aid in separating the WSO gel and the VES fluid, in the case where the two are not compatible or only partially compatible. In certain cases, the brine spacer may also serve to further stabilize the WSO gel.

This method provides a mechanism for selectively decreasing water production and increasing oil production from a formation. The WSO gel may aid in decreasing water production from the water producing layers, while at the same time, preventing stimulation or treatment of those layers by the reactive fluid treatment. The reactive fluid treatment of the oil producing layers will further stimulate oil production from these layers, typically by dissolving or otherwise removing formation damage. This may result in a significant and cost effective shift in the relatively percentages of oil and water produced from a formation treated with this method.

DETAILED DESCRIPTION OF THE PREFERRED EMBODIMENTS

The method of the present invention selectively increases the oil production from a water and oil bearing formation and decreases the water production from the same formation. It should be understood that oil producing zones may produce a certain amount of water or other fluid or gas. Similarly, water producing zones may produce a certain amount of oil or other fluid or gas. By providing a WSO gel that preferentially penetrates the water producing layers of the formation, in conjunction with a VES gel that is broken or degraded by contact with hydrocarbons, the water producing layers may be effectively isolated and protected prior to treatment of the formation with a reactive fluid, such as an acid.

Figure 1:
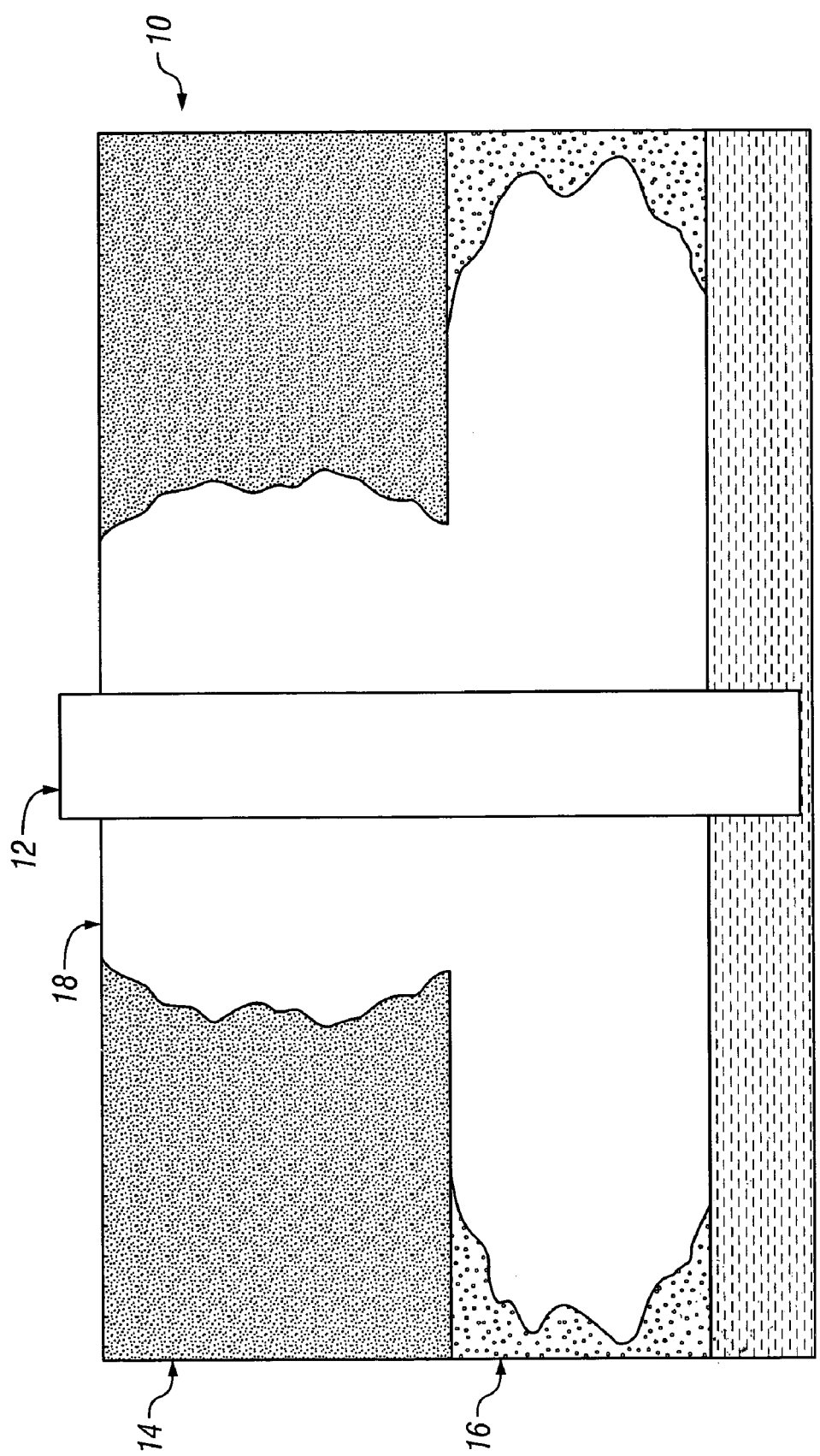
FIG. 1 shows an oil and water producing formation following injection of a water shut-off composition.

FIG. 1 shows a subterranean formation 10 having a wellbore 12 there through. The formation 10 comprises a plurality of layers or zones 14, 16. Particularly, the formation comprises at least one oil producing zone 14 and at least one water producing zone 16. In addition to the water and oil producing zones 14, 16 the formation may also include gas producing zones, not shown. The wellbore 12 preferably extends into or through at least one oil producing zone and one water producing zone.

The first step of the treatment method of the present invention involves providing or pumping a water shut-off composition or gel 18 into the formation. The WSO composition 18 may be any suitable fluid or material capable of forming a thickened gel or gel-like plug or barrier in a zone of the formation. In a preferred embodiment, the WSO composition preferentially or selectively enters or penetrates the water producing zones 16. Although it is preferred that the WSO composition be placed prefentially in the water producing zones, it should be understood that a certain portion of the composition may enter or be deposited into the oil producing zones as well. The placement of the WSO gel is determined by a number of factors including the viscosity of the gel itself, the pressure in each layer, the injectivity of each layer and the injectivity ratio between oil and water layers. The WSO composition may be either organic or inorganic, but is preferably solids-free. Suitable WSO compositions include, but are not limited to: delayed inorganic precipitation systems, delayed organic precipitation systems, monomer or polymer base delayed cross-linking systems, monomer or polymer base reservoir rock absorption or coating systems, resin base delayed gelling systems, foamed gel systems and thixotropic gel systems. Where the formation is sandstone, an acid-based WSO composition is preferred. More preferably, the WSO composition will be water-based, have a viscosity of about less than about 10 cP at 100 s$^{-1}$ (i.e., substantially similar to that of water) and will be acid soluble. Without limiting the foregoing, the following systems are particularly useful in the present invention: polyacrylamide-based fluid in conjunction with an organic crosslinker; polyacrylamide-based fluid in conjunction with chromium; aluminum hydroxychloride-based fluid or relative permeability modifiers, including polyacrylamide polymers, block polymers and copolymers, and terpolymers.

In one embodiment of the invention, the WSO gel may comprise, either inherently or as an additive, a delay mechanism to maintain a reduced viscosity of the gel for a period of time. Depending on the parameters of the formation treatment schedule, the delay mechanism may be varied to prevent a substantial increase in the viscosity of the WSO gel prior to the placement of the VES fluid.

Figure 2:
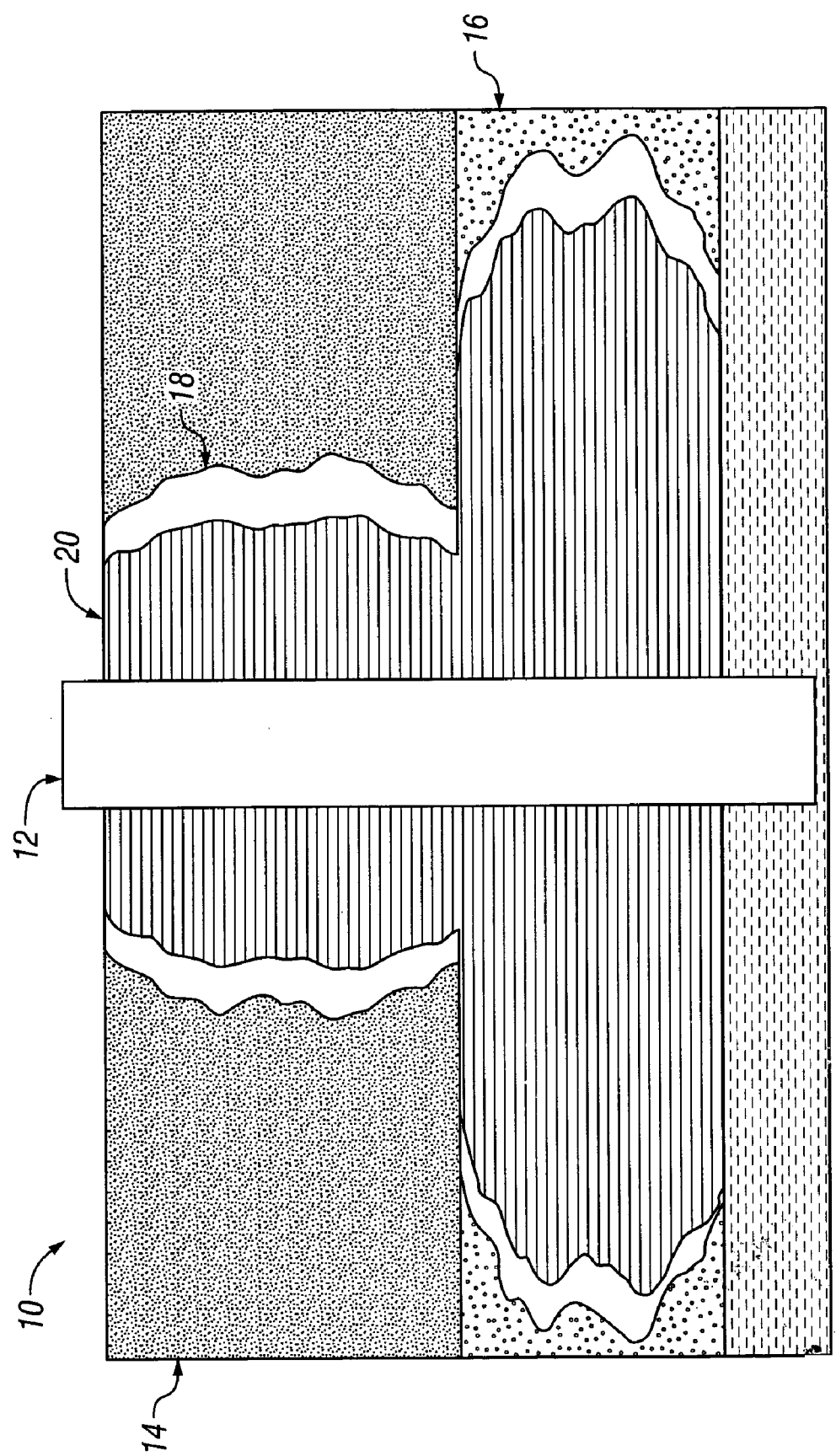
FIG. 2 shows the formation of FIG. 1 following injection of a brine solution.

Following injection of the WSO composition 18 and as shown in FIG. 2, an optional water or brine stage 20 may be pumped into the formation 10. This may be necessary, for instance, where the WSO composition 18 and the VES fluid (not shown) are not compatible. In such a case, the water or brine 20 acts primarily as a spacer between the WSO gel and the VES fluid. In certain circumstances, and depending on the specific WSO gel used, the brine or water may also improve the stability of the WSO gel. Preferably, the salt content, if any, of the water will be compatible with the VES fluid to prevent or delay a premature decrease in the viscosity of the VES fluid. The water may be provided from any suitable source, including well water, any surface water (lakes, ponds, rivers) or seawater. In a preferred embodiment, the spacer will preferentially enter the water producing zones, due in part, to the adverse interaction between the water and the hydrocarbon present in the oil producing layers.

Figure 3:
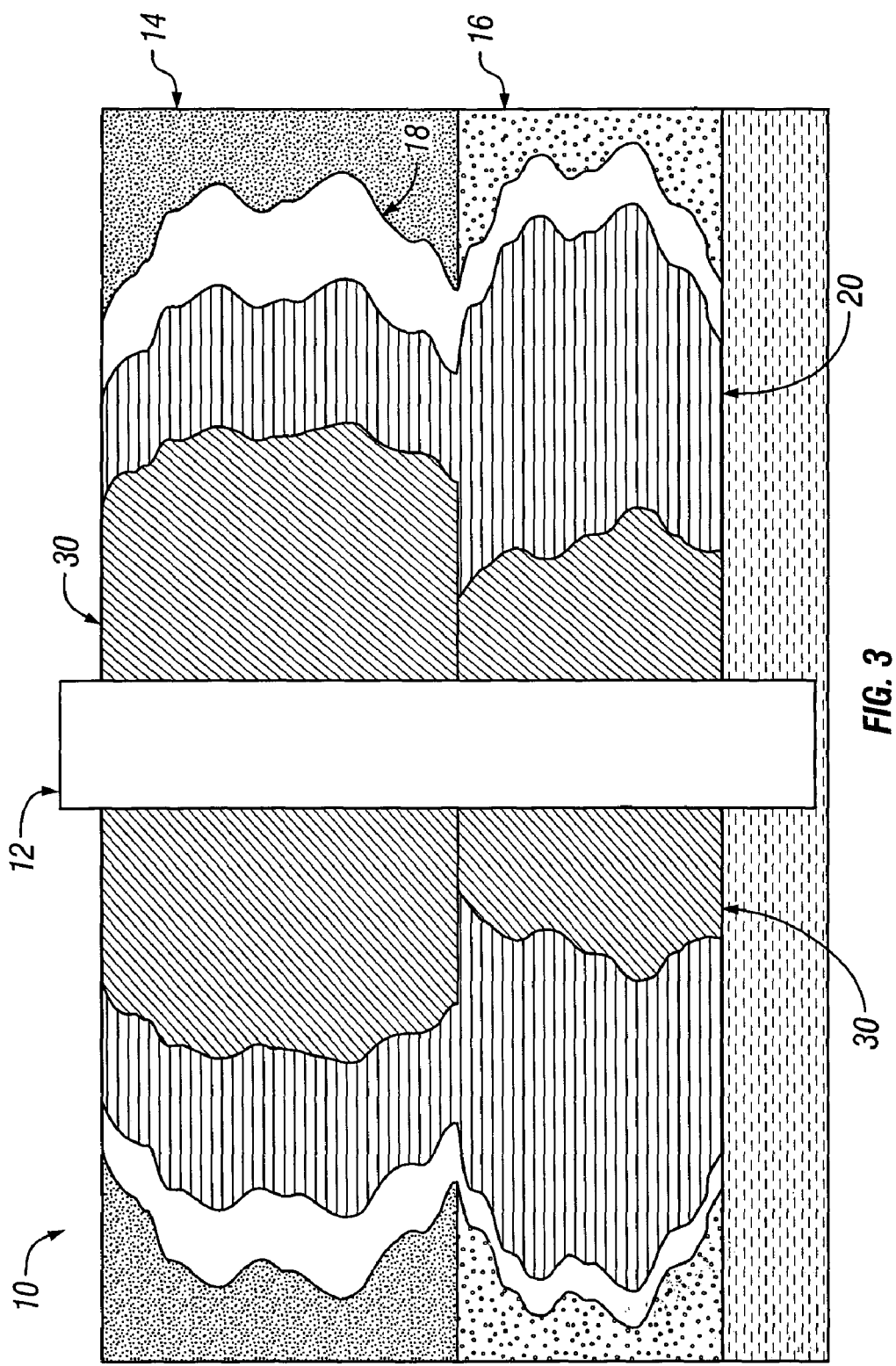
FIG. 3 shows the formation of FIG. 2 following the injection of a VES fluid.

As shown in FIG. 3, the second step of the treatment method is the injection of a VES fluid 30 into the formation 10. In a preferred embodiment, the VES fluid 30 is pumped into or placed in the formation before the WSO gel 18 has significantly increased in viscosity. In this way, the VES fluid will more easily and efficiently penetrate or enter the water producing zones 16. As the VES fluid enters the water producing zones, the viscosity of the fluid will increase. As the VES fluid enters the oil producing zones, the viscosity of the fluid may decrease. Any suitable VES fluid may be used in the present invention. For instance, useful VES fluid compositions are described in U.S. Pat. No. 5,979,557 (which is incorporated herein by reference). Preferably, the VES fluid is formulated such that exposure to hydrocarbon, such as that produced in the oil producing layers, will "break" or significantly reduce the viscosity of the VES fluid. More preferably, the VES fluid is one of Schlumberger's ClearFRAC™ or OilSEEKER™ viscoelastic fluids.

Figure 4:
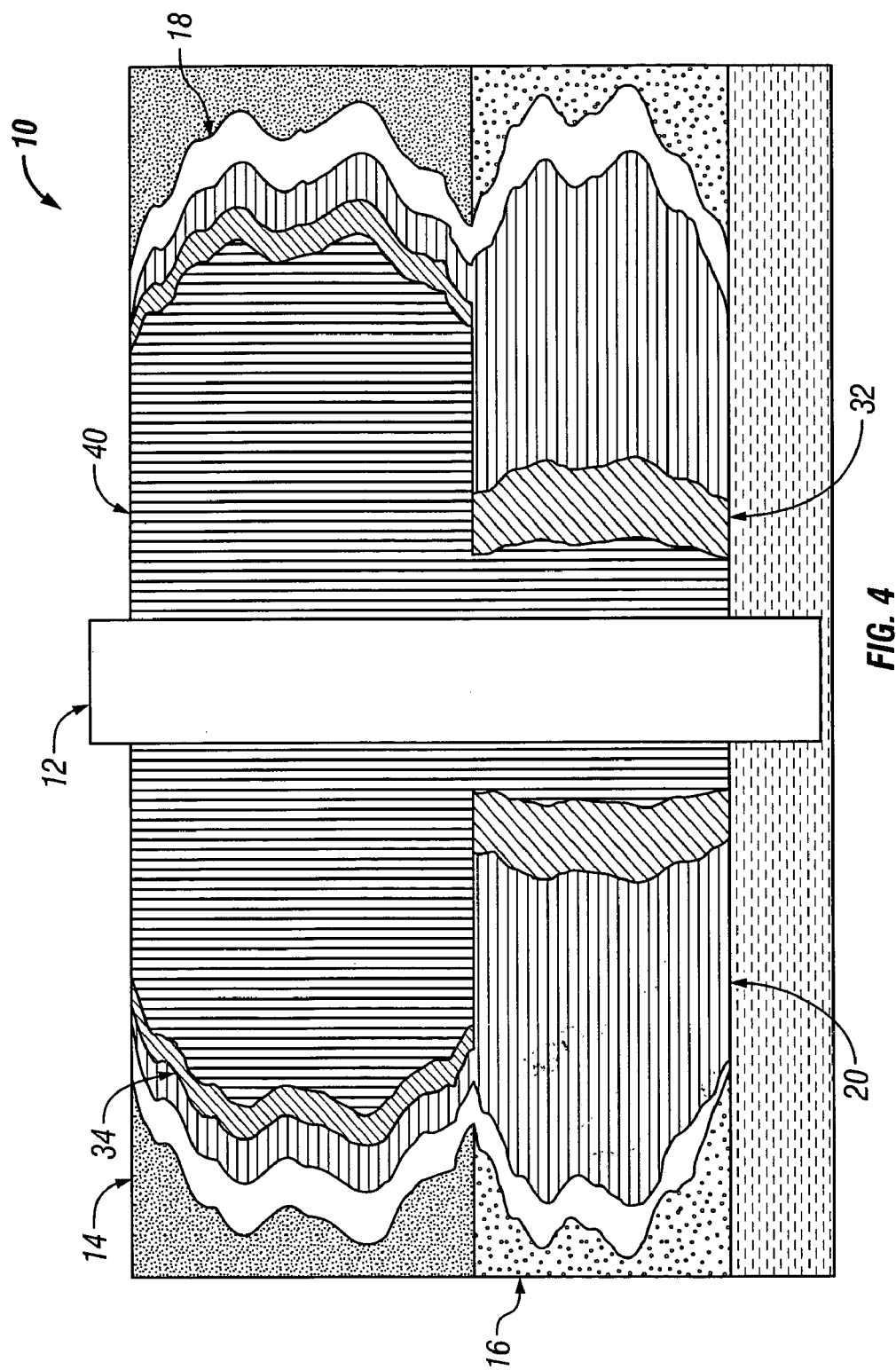
FIG. 4 shows the formation of FIG. 3 following the injection of a reactive fluid.

As shown in FIG. 4, the fourth step of the method is injection or placement of a reactive or acidizing fluid 40 into the formation. The reactive fluid 40 is pumped into the formation 10 and may preferentially enter or penetrate the oil producing layers 14. The WSO gel, which was placed preferentially in the water producing zones 16, in conjunction with the viscosified VES fluid 32, which remained in the water producing zones cause the reactive fluid to preferentially flow into or penetrate the oil producing zones. The "broken" VES fluid 34 in the oil producing zones is flowed back or removed or is otherwise not an impediment to penetration of the oil producing layers by the reactive fluid. The reactive fluid may then interact with or treat the oil producing zones. The reactive fluid is preferably provided to interact with the oil producing zones to increase production from those zones. Any WSO gel and/or VES fluid remaining in the oil producing layers may be removed by the reactive fluid. For instance, where the formation is sandstone, the reactive fluid may dissolve the gel. If the formation is primarily carbonate, the formation rock may be dissolved by the reactive fluid and the gel flowed back out of the oil producing layer. Alternatively, the reactive fluid may dissolve or remove a certain portion of the formation., in a preferred embodiment, the reactive fluid removes or reduces at least some amount of formation damage.

The reactive fluid may be any suitable fluid, but is preferably a matrix acidizing composition, such as an acid (HCl, HF or any suitable organic acid) and/or a chelant. The reactive fluid may further contain any number of suitable additives. For example, corrosion inhibitors, surfactants, solvents and iron control agents may be included in the reactive fluid.

While it is shown that the various fluids, gels and compositions of the present invention are provided or pumped into the formation through the wellbore, it should be understood by those skilled in the art that any suitable delivery mechanism may be employed. For instance, the treatment compositions may be supplied through casing or through the open hole. Alternatively, the treatment compositions may be supplied via coiled tubing. In addition, it may be desirable to isolate certain zones and/or layers mechanically prior to treatment. This may be accomplished using any suitable method. For instance, packers may be placed above and/or below the zones to be treated to isolate a specific number of such zones.

We claim:

1. A method for treating a subterranean formation having at least one oil producing zone and at least one water producing zone, comprising the steps of:
   (a) providing a water shut-off composition to said formation, said water shut-off composition not viscosified with a viscoelastic surfactant, said water shut-off composition preferentially treating said at least one water producing zone; then
   (b) providing a VES fluid to said formation wherein after said providing of said VES fluid said VES fluid is substantially less viscous in the at least one oil producing zone than in the at least one water producing zone; and then
   (c) providing a matrix acidizing compostion to said formation, said matrix acidizing composition selected from the group consisting of an acid, a chelant, and mixtures thereof, said VES fluid in said at least one water producing zone impeding interaction of said matrix acidizing composition with said water shut-off composition, whereby said matrix acidizing composition preferentially dissolves said water shut-off composition in said oil producing zone.

2. The method of claim 1, wherein said water shut-off composition and said VES fluid is preferentially provided in the at least one water producing zone and said matrix acidizing composition is preferentially provided in the at least one oil producing zone.

3. The method of claim 1, further comprising the step of providing water to said formation following step (a) and prior to step (b).

4. The method of claim 3, wherein said water is brine.

5. The method of claim 1, wherein said water shut-off composition is selected from the group consisting of: delayed inorganic precipitation systems, delayed organic precipitation systems, monomer or polymer base delayed cross-linking systems, monomer or polymer base reservoir rock absorption or coating systems, resin base delayed gelling systems, foamed gel systems and thixotropic gel systems.

6. The method of claim 1, wherein said water shut-off composition is a polyacrylamide-based fluid in conjunction with an organic crosslinker.

7. The method of claims 1, wherein said water shut-off composition is a polyacrylamide-based fluid in conjunction with chromium.

8. The method of claims 1, wherein said water shut-off composition is an aluminum hydroxychloride-based fluid.

9. The method of claims 1, wherein said water shut-off composition is a relative permeability modifier.

10. The method of claims 9, wherein said relative permeability modifier is a polyacrylamide.

11. The method of claims 9, wherein said relative permeability modifier is a block polymer.

12. The method of claim 1, wherein said water shut-off composition has a viscosity of about 10 cP at 100 s$^{-1}$.

13. The method of claim 1, wherein said matrix acidizing composition is an organic acid.

14. The method of claim 1, wherein said matrix acidizing composition is HCl or HF.

15. The method of claim 1, wherein said matrix acidizing composition is a chelant.

16. The method of claim 1, wherein said VES fluid decreases in viscosity when exposed to hydrocarbons.

17. A method for treating a subterranean formation having at least one oil producing zone and at least one water producing zone, comprising the sequential steps of:
   (a) providing a water shut-off composition to said formation;
   (b) providing water to said formation
   (c) providing a VES fluid to said formation; and
   (d) providing a matrix acidizing composition, selected from the group consisting of an acid, a chelant, and mixtures thereof, to said formation.

18. The method of claim 17 wherein said water is brine.

19. A method for treating a subterranean formation having at least one oil producing zone and at least one water producing zone, comprising the steps of:
   (a) providing a water shut-off composition selected from the group consisting of an aluminum hydroxychloride-based fluid and a relative permeability modifier comprising a block polymer to said formation;
   (b) providing a VES fluid to said formation; and
   (c) providing a matrix acidizing composition, selected from the group consisting of an acid, a chelant, and mixtures thereof, to said formation.

20. A method for treating a subterranean formation having at least one oil producing zone and at least one water producing zone, comprising the separate steps of:
   (a) providing a water shut-off composition to said formation;
   (b) providing a VES fluid to said formation; and
   (c) providing a reactive fluid comprising a chelant to said formation.

21. The method of claim 1 wherein the VES fluid is provided before the water shut-off composition has significantly increased in viscosity.

* * * * *